(12) United States Patent
Dimitrovski et al.

(10) Patent No.: US 11,503,498 B2
(45) Date of Patent: Nov. 15, 2022

(54) INFORMATION-CENTRIC NETWORKING OVER 5G OR LATER NETWORKS

(71) Applicants: Koninklijke KPN N.V., Rotterdam (NL); Nederlandse Organisatie Voor Toegepast-Natuurwetenschappelijk Onderzoek TNO, s-Gravenhage (NL)

(72) Inventors: Toni Dimitrovski, The Hague (NL); Pieter Nooren, Delft (NL); Lucia D'Acunto, Delft (NL); Bastiaan Wissingh, Leiden (NL)

(73) Assignees: KONINKLUKE KPN N.V., Rotterdam (NL); NEDERLANDSE ORGANISATIE VOOR TOEGEPAST-NATUURWETEN SCHAPPELIJK ONDERZOEK TNO, 'S-Gravenhage (NL)

( * ) Notice: Subject to any disclaimer, the term of this patent is extended or adjusted under 35 U.S.C. 154(b) by 0 days.

(21) Appl. No.: 17/268,438

(22) PCT Filed: Aug. 23, 2019

(86) PCT No.: PCT/EP2019/072548
§ 371 (c)(1),
(2) Date: Feb. 12, 2021

(87) PCT Pub. No.: WO2020/039056
PCT Pub. Date: Feb. 27, 2020

(65) Prior Publication Data
US 2021/0345166 A1 Nov. 4, 2021

(30) Foreign Application Priority Data
Aug. 24, 2018 (EP) .................................... 18190636

(51) Int. Cl.
*H04W 28/02* (2009.01)
*H04W 28/24* (2009.01)

(52) U.S. Cl.
CPC ... *H04W 28/0289* (2013.01); *H04W 28/0268* (2013.01); *H04W 28/0284* (2013.01); *H04W 28/24* (2013.01)

(58) Field of Classification Search
CPC ......... H04W 28/0268; H04W 28/0284; H04W 28/24; H04W 28/0289; H04L 67/322; H04L 67/327; H04L 47/11; H04L 47/12
See application file for complete search history.

(56) References Cited

U.S. PATENT DOCUMENTS

2017/0041231 A1* 2/2017 Seed ..................... H04L 67/12
2017/0332258 A1* 11/2017 Rozhnova ............. H04W 76/15
(Continued)

FOREIGN PATENT DOCUMENTS

WO    WO 2016/170559 A1    10/2016
WO    WO-2017202334 A1 * 11/2017 ............. H04L 67/32
(Continued)

OTHER PUBLICATIONS

Ravindran Huawei P Suthar Cisco D Trossen Interdigital Inc G White Cablelabs R: "Enabling ICN in 3GPP's 5G NextGen Core Architecture; draft-ravi-icnrg-5gc-icn-02.txt", Enabling ICN in 3GPP's 5G Nextgen Core Architecture; draft-ravi-icnrg-5gb-icn-02.txt; Internet-Draft: Jul. 2, 2018, XP015127538 (Year: 2018).*
(Continued)

*Primary Examiner* — Mehmood B. Khan
(74) *Attorney, Agent, or Firm* — Hamilton, Brook, Smith & Reynolds, P.C.

(57) ABSTRACT

In a communication network, a network function may be provided for controlling Information Centric Networking (ICN) protocol-based traffic flow between a set of user
(Continued)

equipment (UE). This network function may be an ICN application function (ICN-AF), and may obtain ICN layer information from an ICN router which is indicative of a congestion state of a current PDU session of user equipment. If the congestion state indicates congestion, the ICN-AF may initiate establishment of a new PDU session for the user equipment (UE1) or initiate upgrade of a quality of service (QoS) characteristic of the current PDU session, for example using the session management function (SMF) and via the SMF's session management of PDU sessions.

15 Claims, 10 Drawing Sheets

(56) References Cited

U.S. PATENT DOCUMENTS

| | | | |
|---|---|---|---|
| 2018/0192471 | A1 | 7/2018 | Li et al. |
| 2018/0376444 | A1 | 12/2018 | Kim et al. |
| 2019/0261260 | A1 | 8/2019 | Dao et al. |
| 2019/0281491 | A1* | 9/2019 | Cheng ............... H04W 28/0252 |
| 2019/0306758 | A1 | 10/2019 | Ma et al. |
| 2020/0163145 | A1 | 5/2020 | Park et al. |
| 2020/0187043 | A1 | 6/2020 | Xin et al. |
| 2020/0228429 | A1 | 7/2020 | Xin et al. |
| 2021/0160680 | A1 | 5/2021 | Velev et al. |
| 2021/0168695 | A1 | 6/2021 | Ryu et al. |
| 2021/0194989 | A1 | 6/2021 | Dimitrovski et al. |
| 2021/0204357 | A1 | 7/2021 | Tang |

FOREIGN PATENT DOCUMENTS

| | | | |
|---|---|---|---|
| WO | WO 2018/137755 A1 | 8/2018 | |
| WO | WO 2018/225039 A1 | 12/2018 | |
| WO | WO 2020/039054 A1 | 2/2020 | |
| WO | WO-2020039056 A1 * | 2/2020 | .............. H04L 47/11 |
| WO | WO-2021091321 A1 * | 5/2021 | |

OTHER PUBLICATIONS

3GPP: 3rd Generation Partnership Project: System Architecture for the 5G System, 3GPP TS 23.501 version 15.2.0 Release 15, V15.2.0 (2018).
3GPP: 3rd Generation Partnership Project: Procedures for the 5G System, 3GPP TS 23.502 version 15.2.0 Release 15, V15.2.0 (2018).
3GPP: 3rd Generation Partnership Project: Technical Specification Group Services and System Aspects "System Architecture for the 5G System, Stage 2", (Release 15), TS 22.261 (2017).
Ravindran, R., et al., "5G-ICN: Delivering ICN Services over 5G Using Network Slicing", IEEE Communications Magazine, May 2017.
Ravindran, R., et al., "Deploying ICN in 3GPP's 5G NextGen Core Architecture," IEEE 5G World Forum, pp. 26-32 (2018).
Ravindran, R., et al., "Enabling ICN in 3GPP's 5G NextGen Core Architecture," ICNRG, pp. 1-26 (2018).
CCN—lite implementation of the CCNx protocol, Retrieved from the Internet URL: http://ccn-lite.net (Aug. 28, 2018).
Nooren. P., et al., "Deploying ICN islands in a sea of IP—The role of interconnection and business models: Posterpaper," 8th International Conference on the Network of the Future (NOF) (2017).
Named Data Networking Project, Retrieved from the Internet URL: http://named-data.net/ (Aug. 28, 2018).
International Search Report for International Application No. PCT/EP2019/072548, titled: "Information-Centric Networking Over 5G or Later Networks," dated Sep. 16, 2019.

* cited by examiner

INFORMATION-CENTRIC NETWORKING OVER 5G OR LATER NETWORKS

This application is the U.S. National Stage of International Application No. PCT/EP2019/072548, filed Aug. 23, 2019, which designates the U.S., published in English, and claims priority under 35 U.S.C. § 119 or 365(c) to European Application No. 18190636.3, filed Aug. 24, 2018. The entire teachings of the above applications are incorporated herein by reference.

FIELD OF THE INVENTION

The invention relates to a communication network having data planes and network functions, and to a set of user equipment (pl.) which may be connected to the communication network and which may represent Information-Centric Networking (ICN) nodes of an ICN network. The communication network may, during operational use, transport ICN protocol-based traffic of the ICN nodes. More in particular, the invention relates to congestion handling of ICN protocol-based traffic which is transported via one or via protocol data unit (PDU) sessions in the communication network.

The invention further relates to entities associated with the communication network, such as a network node or a distributed system of network nodes, to a method for use with the communication network, and to a computer program comprising instructions for causing a processor system to perform the method.

BACKGROUND ART

Information-Centric Networking (ICN)

Information-Centric Networking (ICN) refers to a class of network architectures for the transport and distribution of content. Specific examples of ICN architectures include, but are not limited, to those implemented by [1] and [2]. The concept behind ICN architectures is to replace the host-centric endpoints paradigm of current Internet Protocol (IP)-based architectures by a named information paradigm, by which every network node in the ICN network can request a particular piece of content (with this network node henceforth also being referred to as a 'requester' of content) and receive it from any other network node that has the content (with this network node henceforth also being referred to as a 'publisher' of the content). A requester may consume the content it requests itself or alternatively may request the content on behalf of another node. There may thus be a chain of nodes between the publisher and the consumer of content. In such ICN-based network architectures, content consumer mobility is typically native and does not need specific handling.

From a historical perspective, the road to any 'Future Internet' with ICN at its core is likely to involve gradually replacing the incumbent network architecture. Such gradually replacing may involve concepts such those described in [3], in which a so-called 'sea of IP' has to interconnect the initially small 'islands' of ICN networks.

Next Generation (5G) Communication Networks

The interconnections between the islands of ICN networks are likely to use next generation communication networks, such as 3GPP's 5G [5]. These communication networks may separate network functions from the underlying hardware resources, being the network nodes of the communication network. For that purpose, so-called Network Virtualization (NV) techniques may be used, and in particular Network Function Virtualization (NFV) techniques which provide network functions that are instantiable in software using the hardware of one or more of the network nodes. In the following, 'providing' or 'establishing' a network function may thus refer to the instantiation of the network function in the communication network.

The next generation communication networks may further provide virtual data planes which separate data traffic in the network. Such virtual data planes, which may be established by Software-Defined Network (SDN) but also by other techniques, may include a control plane to enable transmission of control data in the network, and a user plane to enable transmission of user data to and/or from User Equipment (UE) connected to the network. The user plane may also be referred to as 'data plane'.

Moreover, a set of virtualized network functions may be provided which may be instantiable using one or more of the plurality of network nodes and which comprise user plane functions operating in the user plane and control plane functions operating in the control plane. For example, such control plane functions may include a Session Management Function (SMF) configured for session management of protocol data unit (PDU) sessions involving user equipment connected to the communication network.

It is noted that although the above refers to virtualization of data planes and network functions, it is also known to establish the data planes and the network functions as described in this specification without virtualization techniques.

The main advantages of these communication networks in regard to content distribution may be their wide wireless coverage and their handling of mobility.

Furthermore, it is envisioned that these communication networks will for the first time achieve 'true' fixed-mobile convergence—one 'core' communication network as an umbrella to many access networks. This provides the potential to have a single entry point to the Internet for a subscriber regardless of access type usage.

ICN Via Next Generation Communication Networks

3GPP [5] currently does not provide native support for ICN protocols, nor is such support envisioned. As such, it is envisioned that ICN protocol-based traffic will be overlaid over next-generation communication networks (also referred to as 'ICN-as-an-overlay') and control over the ICN protocol-based traffic may have to be exercised outside of the communication network's domain. In such and similar situations, there may be a need to provide congestion handling of ICN protocol-based traffic.

Congestion handling at the PDU session level is known per se. A problem of such congestion handling solely at the PDU session level is that such congestion handling is confined to any limits and thresholds of the PDU session itself. Such congestion handling thus does not consider ICN layer information. For example, ICN protocol-based traffic may be dropped or prioritized without any greater knowledge about the nature of the ICN protocol-based traffic on top of the PDU session.

Although the above problem is described for a 3GPP 5G communication network, a similar problem is expected to occur with other communication networks which do not provide native support for ICN protocols. Accordingly, any technical measures described with the context of a 3GPP or 5G communication network are to be understood to apply to such other networks as well, mutatis mutandis.

REFERENCES

[1] Named Data Networking Project, http://named-data.net/
[2] CCN-lite implementation of the CCNx protocol, http://ccn-lite.net
[3] Pieter Nooren, Niels van Adrichem, Lucia D'Acunto, "*Deploying ICN islands in a sea of IP—The role of interconnection and business models: Poster paper*", 2017 8th International Conference on the Network of the Future (NOF)
[4] Ravishankar Ravindran, Asit Chakraborti, Syed Obaid Amin, Aytac Azgin, and Guoqiang Wang, "*5G-ICN: Delivering ICN Services over 5G Using Network Slicing*", IEEE Communications Magazine, May 2017
[5] 3rd Generation Partnership Project, Technical Specification Group Services and System Aspects, "*System Architecture for the 5G System, Stage 2 (Release 15)*", TS 22.261, 2017-09, section 6.10.2.

SUMMARY OF THE INVENTION

It would be desirable for a communication network which has no native support for ICN protocols and in which ICN protocol-based traffic is transported via PDU sessions to provide congestion handling for said ICN protocol-based traffic.

To this end, a new network function may be provided in the communication network, namely an ICN application function (ICN-AF) configured to control ICN protocol-based traffic flow between a set of user equipment (UE). Specifically, the ICN-AF may obtain ICN layer information from an ICN router which is indicative of a congestion state of a current PDU session of user equipment. If the congestion state indicates congestion, the ICN-AF may initiate establishment of a new PDU session for the user equipment (UE1) or initiate upgrade of a quality of service (QoS) characteristic of the current PDU session, for example using the session management function (SMF) and based on the SMF's session management of protocol data unit (PDU) sessions.

In accordance with a first aspect of the invention, an information-centric networking application function (ICN-AF) may be provided for use with a communication network. The communication network may comprise a plurality of network nodes and may be configured to provide one or more of:
 a control plane to enable transmission of control data in the communication network;
 a user plane to enable transmission of data to or from user equipment which is connected to the communication network; and
 a set of network functions which may comprise control plane functions operating in the control plane, wherein the control plane functions may include the information-centric networking application function (ICN-AF) for controlling a flow of ICN protocol-based traffic between a set of user equipment (UE), wherein the ICN protocol-based traffic may be at least in part transported via protocol data unit (PDU) sessions in the communication network;
 wherein the communication network may further comprise an ICN router for obtaining ICN layer information which at least in part characterizes the flow of the ICN protocol-based traffic which is transported via one or more PDU sessions;
wherein the ICN application function (ICN-AF) may be configured to:
 receive ICN layer information from the ICN router which is indicative of a congestion state of a current PDU session of user equipment (UE1); and
 based on the ICN layer information indicating congestion, initiate establishment of a new PDU session for the user equipment (UE1) or initiate upgrade of a quality of service (QoS) characteristic of the current PDU session.

In accordance with a further aspect of the invention, a method may be provided for use with a communication network. The communication network may comprise a plurality of network nodes and be configured to provide one or more of:
 a control plane to enable transmission of control data in the communication network;
 a user plane to enable transmission of data to or from user equipment which is connected to the communication network; and
 a set of network functions which may comprise control plane functions operating in the control plane;
wherein the communication network may further comprise an ICN router configured to obtain ICN layer information which at least in part characterizes a flow of ICN protocol-based traffic which is transported via one or more PDU sessions;
The method may comprise:
 receiving ICN layer information from the ICN router which is indicative of a congestion state of a current PDU session of user equipment (UE1); and
 based on the ICN layer information indicating congestion, initiating establishment of a new PDU session for the user equipment (UE1) or initiating upgrade of a quality of service (QoS) characteristic of the current PDU session.

In accordance with a further aspect of the invention, an information-centric networking (ICN) router may be provided for use with a communication network. The communication network may comprise a plurality of network nodes and be configured to provide one or more of:
 a control plane to enable transmission of control data in the communication network;
 a user plane to enable transmission of data to or from user equipment which is connected to the communication network; and
 a set of network functions which may comprise control plane functions operating in the control plane, wherein the control plane functions may include an ICN application function (ICN-AF) for controlling a flow of ICN protocol-based traffic between a set of user equipment (UE), wherein the ICN protocol-based traffic may be at least in part transported via protocol data unit (PDU) sessions in the communication network;
wherein the ICN router may be configured to
 provide ICN layer information to the ICN application function (ICN-AF) which at least in part characterizes the flow of the ICN protocol-based traffic via one or more PDU sessions, wherein the ICN layer information is indicative of a congestion state of a current PDU session of user equipment (UE1).

In accordance with a further aspect of the invention, a method may be provided for use with a communication network. The communication network may comprise a plurality of network nodes and be configured to provide one or more of:

a control plane to enable transmission of control data in the communication network;

a user plane to enable transmission of data to or from user equipment which is connected to the communication network; and a set of network functions which comprise control plane functions operating in the control plane, wherein the control plane functions include an information-centric networking application function (ICN-AF) for controlling a flow of ICN protocol-based traffic between a set of user equipment (UE);

the method comprising:

providing ICN layer information to the ICN application function (ICN-AF) which at least in part characterizes the flow of the ICN protocol-based traffic which is transported via one or more PDU sessions, wherein the ICN layer information is indicative of a congestion state of a current PDU session of user equipment (UE1).

In accordance with a further aspect of the invention, a session management function (SMF) may be provided for session management of protocol data unit (PDU) sessions in a communication network. The communication network may comprise a plurality of network nodes and be configured to provide one or more of:

a control plane to enable transmission of control data in the communication network;

a user plane to enable transmission of data to or from user equipment which is connected to the communication network; and a set of network functions which may comprise control plane functions operating in the control plane, wherein the control plane functions may include:

the session management function (SMF) for the session management of protocol data unit (PDU) sessions involving the user equipment, and an information-centric networking application function (ICN-AF) for controlling a flow of ICN protocol-based traffic between a set of user equipment (UE), wherein the ICN protocol-based traffic may be at least in part transported via the protocol data unit (PDU) sessions in the communication network;

wherein the session management function (SMF) may be configured to:

receive ICN layer information from the ICN application function (ICN-AF) which is indicative of a congestion state of a current PDU session of user equipment (UE1);

analyze PDU session layer information of the current PDU session of user equipment (UE1);

and based the ICN layer information and the PDU session layer information both indicating congestion, decide between establishing a new PDU session for the user equipment (UE1) or upgrading a quality of service (QoS) characteristic of the current PDU session.

In accordance with a further aspect of the invention, a method may be provided for use with a communication network. The communication network may comprise a plurality of network nodes and be configured to provide one or more of:

a control plane to enable transmission of control data in the communication network;

a user plane to enable transmission of data to or from user equipment which is connected to the communication network; and a set of network functions which may comprise control plane functions operating in the control plane, wherein the control plane functions may include an information-centric networking application function (ICN-AF) for controlling a flow of ICN protocol-based traffic between a set of user equipment (UE);

The method may comprise:

receiving ICN layer information from the ICN application function (ICN-AF) which is indicative of a congestion state of a current PDU session of user equipment (UE1);

analyzing PDU session layer information of the current PDU session of user equipment (UE1);

and based the ICN layer information and the PDU session layer information both indicating congestion, deciding between establishing a new PDU session for the user equipment (UE1) or upgrading a quality of service (QoS) characteristic of the current PDU session.

In accordance with a further aspect of the invention, a communication network may be provided comprising a plurality of network nodes. The communication network may be configured to provide one or more of:

a control plane to enable transmission of control data in the communication network;

a user plane to enable transmission of data to or from user equipment which is connected to the communication network; and a set of network functions which may comprise control plane functions operating in the control plane, wherein the control plane functions may include an information-centric networking application function (ICN-AF) for controlling a flow of ICN protocol-based traffic between a set of user equipment (UE), wherein the ICN protocol-based traffic may be at least in part transported via protocol data unit (PDU) sessions in the communication network;

wherein the communication network may further comprise:

an ICN router configured to obtain ICN layer information which at least in part characterizes the flow of the ICN protocol-based traffic which is transported via one or more PDU sessions; and the ICN application function (ICN-AF), which may be configured to:

receive ICN layer information from the ICN router which is indicative of a congestion state of a current PDU session of user equipment (UE1); and based on the ICN layer information indicating congestion, initiate establishment of a new PDU session for the user equipment (UE1) or initiate upgrade of a quality of service (QoS) characteristic of the current PDU session.

In accordance with a further aspect of the invention, transitory or non-transitory computer-readable medium may comprise a computer program which may comprise instructions for causing a processor system to perform any of the above-described methods.

The above measures may be based on the consideration that, in a communication network which transports ICN-protocol-based traffic, the congestion handling may be improved by taking ICN layer information into account which is indicative of a congestion state at the ICN layer level. Such ICN layer information may then, possibly combined with PDU session layer information and other types of information, be used to improve the traffic flow, for example by establishing new PDU sessions or upgrading the QoS characteristic of current, i.e., existing, PDU sessions.

For that purpose, an ICN application function (ICN-AF) may be provided. In general, application functions may be provided in communication networks to 'tailor' the communication network to the requirements of applications which use the network. For example, 3GPP [5] describes an architecture for a next generation mobile network which includes application functions. This architecture is shown in FIG. 1, where the AF is shown to be instantiated as a control plane function operating in the Control Plane (CP) of the network. However, the AF in this architecture may be seen as merely representing a function placeholder for different applications and having only broadly defined procedures for how applications can influence the network traffic.

The ICN-AF may be specifically configured to control ICN protocol-based traffic flow between ICN nodes. As such, the ICN may have standard, e.g., 3GPP, functionality of an AF network function as well as ICN-specific functionality. Specifically, the ICN-AF may receive ICN layer information from an ICN router which is indicative of a congestion state of a current PDU session of user equipment (UE1). An example of an ICN router is a UPF via which the current PDU session is routed and which is modified to report the ICN layer information to the ICN-AF. If the congestion state indicates congestion, the ICN-AF may then initiate establishment of a new PDU session for the user equipment (UE1) or initiate upgrade of a quality of service (QoS) characteristic of the current PDU session, for example using a session management function (SMF) and via the SMF's capability for session management of PDU sessions. The latter may for example involve the ICN-AF triggering the UE to establish a new PDU session or directly requesting the SMF to establish the new PDU session or to upgrade the QoS characteristic of the current PDU session, but in some embodiments may also involve the ICN-AF forwarding the ICN layer information to the SMF so as to prompt the SMF to establish the new PDU session or to upgrade the QoS characteristic of the current PDU session on the basis of the ICN layer information.

In the above and following, the term 'congestion state' may refer to a qualitative and/or quantitative assessment of congestion, which may be a nonbinary assessment, e.g., reflecting a degree of congestion, or a binary assessment, e.g., congested or not. The ICN layer information being 'indicative of' the congestion state may refer to the ICN layer information allowing the congestion state to be determined using the ICN layer information by itself, or together with auxiliary information such as capacity information indicating a capacity of the current PDU session. For example, the ICN layer information may comprise one or more metrics or datapoints which allow the congestion state to be determined, but may also directly contain the congestion state, for example if the congestion state is already determined by the ICN router and subsequently reported to the ICN-AF. Furthermore, the term 'congested' may refer to the congestion state being considered by the ICN-AF or other entity to represent congestion in accordance with a congestion criterion, for example by one or more congestion metrics exceeding a static or dynamic threshold. The 'upgrading' of a QoS characteristic may refer to an adjustment of the QoS characteristic which increases the overall QoS, for example, being an increase of capacity of a PDU session.

An advantage of the use of the ICN-AF may be that the communication network better supports ICN protocol-based traffic between user equipment acting as ICN nodes. In particular, ICN layer information which may be indicative of congestion at the ICN layer may effectively be 'passed down' to entities at the PDU session level, allowing congestion at the ICN level to be addressed at least in part at the PDU session level. This may allow a more differentiated approach to congestion handling of ICN protocol-based traffic compared to the approach in which only PDU session level information is considered in the congestion handling. Such congestion handling may be well suited for facilitating a gradual introduction of ICN towards an ICN 'Future Internet'.

In an embodiment, the control plane functions may further comprise a session management function (SMF) for session management of protocol data unit (PDU) sessions involving the user equipment, and the ICN application function (ICN-AF) may be configured to initiate the establishment of the new PDU session for the user equipment (UE1) or initiate the upgrade of the quality of service (QoS) characteristic of the current PDU session via the session management function (SMF).

In an embodiment, the ICN application function (ICN-AF) may be further configured to, based on the ICN layer information indicating congestion:
  request the session management function (SMF) to establish the new PDU session or to upgrade the quality of service (QoS) characteristic of the current PDU session; or
  trigger the user equipment (UE1) to establish the new PDU session.

These represent two alternatives for the ICN-AF to initiate the establishment of a new PDU session or the upgrading of the QoS characteristic of the current PDU session. Here, 'trigger' may refer to the ICN-AF sending a message to the UE containing an instruction to initiate the establishment of a PDU session. This message may for example be delivered via the control plane of the communication network or via the existing, i.e., current PDU session.

In an embodiment, the ICN layer information may be indicative of a throughput of ICN packets of the ICN protocol-based traffic in the current PDU session, and the ICN application function (ICN-AF) may be further configured to:
  obtain capacity information from the session management function (SMF) which is indicative of a capacity of the current PDU session; and
  determine the congestion state of the current PDU session by comparing the capacity of the current PDU session to the throughput of ICN packets.

The ICN-AF may thus combine PDU session level information, namely said capacity information, with ICN level information to determine the congestion state of the current PDU session and to initiate the PDU session upgrade/new-establishment. It is noted that in some embodiments, also other types of ICN layer information and PDU session information may be obtained and compared to determine the congestion state.

It is further noted that in embodiments in which the ICN-AF forwards the ICN layer information to the session management function (SMF), e.g., as described elsewhere, the SMF may perform the above steps to determine the congestion state.

In an embodiment, the control plane functions may further comprise a policy control function (PCF) for policy control of quality of service in the communication network, and the ICN application function (ICN-AF) may be further configured to:
  obtain policy data indicative of a quality of service (QoS) policy for the current PDU session from the policy control function (PCF); and decide between establishing the new PDU session or upgrading the quality of service (QoS) characteristic of the current PDU session based on the quality of service (QoS) policy.

The QoS policy may for example indicate whether it is possible and/or what are the options to upgrade the QoS characteristic of the current PDU session. The ICN-AF may then select between both options and initiate the selected option as described elsewhere.

In an embodiment, the ICN application function (ICN-AF) may be further configured to forward the ICN layer information which is received from the ICN router and which is indicative of the congestion state of the current PDU session to the session management function (SMF) to enable the session management function (SMF) to establish the new PDU session for the user equipment (UE1) or to upgrade the quality of service (QoS) characteristic of the current PDU session. In accordance with this embodiment, the ICN-AF may decide to forward the ICN layer information from the ICN router to the SMF, which may be seen as a request for the SMF to establish the new PDU session or to upgrade the QoS characteristic of the current PDU session.

In an embodiment, the ICN router may be implemented as part of a user plane function (UPF) via which the current PDU session of the user equipment (UE1) is routed, and the ICN layer information may be obtained by the user plane function (UPF) and/or by the ICN router from the user plane function (UPF).

In an embodiment, the ICN router may be further configured to:
monitor a pending interest table (PIT) of the user plane function (UPF);
determine the congestion state of the current PDU session of the user equipment (UE1) based on a characterization of when one or more entries in the pending interest table (PIT) are satisfied.

In an embodiment, the ICN router may be further configured to obtain information which may be indicative of a throughput of ICN packets of the ICN protocol-based traffic in the current PDU session, and to:
provide said throughput information as or as part of the ICN layer information to the ICN application function (ICN-AF); or
determine the congestion state of the current PDU session by comparing a capacity of the current PDU session to the throughput of ICN packets, and to generate the ICN layer information to represent the congestion state.

In an embodiment, the ICN router may be implemented by an user equipment representing an ICN node connecting a plurality of ICN nodes to the communication network. The current PDU session of the user equipment (UE1) may be routed via the UE implementing the ICN router. The plurality of ICN nodes may form an 'island' of ICN nodes which are connected to the communication network via the ICN router. The user equipment (UE1) may be part of the island of ICN nodes, or may send and/or receive ICN-protocol based traffic to and/or from the island of ICN nodes via the ICN router.

In an embodiment, the control plane functions may further comprise a network exposure function, and the ICN application function may be configured to communicate with the session management function and/or other control plane functions via the network exposure function.

In an embodiment, the control plane functions may further comprise a policy control function for policy control of quality of service in the communication network, the session management function may be configured to perform the session management based on policy data provided by the policy control function, and the ICN application function may be configured to control the session management of protocol data unit sessions via the policy control function.

In an embodiment, the communication network may be a telecommunication network. In an embodiment, the communication network may comprise a core network, e.g., of a connectivity provider's network. The connectivity provider's network may be a network adhering to one or more 3GPP standards.

Any one of the ICN application function (ICN-AF), the ICN router or the session management function (SMF) may be implemented by a network node or a distributed system of network nodes, which network node(s) may comprise a network interface to the communication network and a processor system configured to perform functions described with reference to the respective entity (ICN-AF, ICN router, SMF).

Any function names such as ICN-AF, SMF, PCF and NEF are descriptive names but do not imply limitations other than those claimed and/or described.

It will be appreciated by those skilled in the art that two or more of the above-mentioned embodiments, implementations, and/or aspects of the invention may be combined in any way deemed useful.

Modifications and variations of any one of the processor systems, network nodes, the method and/or the computer programs, which correspond to the described modifications and variations of the communication network, and vice versa, may be carried out by a person skilled in the art on the basis of the present description.

BRIEF DESCRIPTION OF THE DRAWINGS

These and other aspects of the invention are apparent from and will be elucidated with reference to the embodiments described hereinafter. In the drawings.

Figure 1:
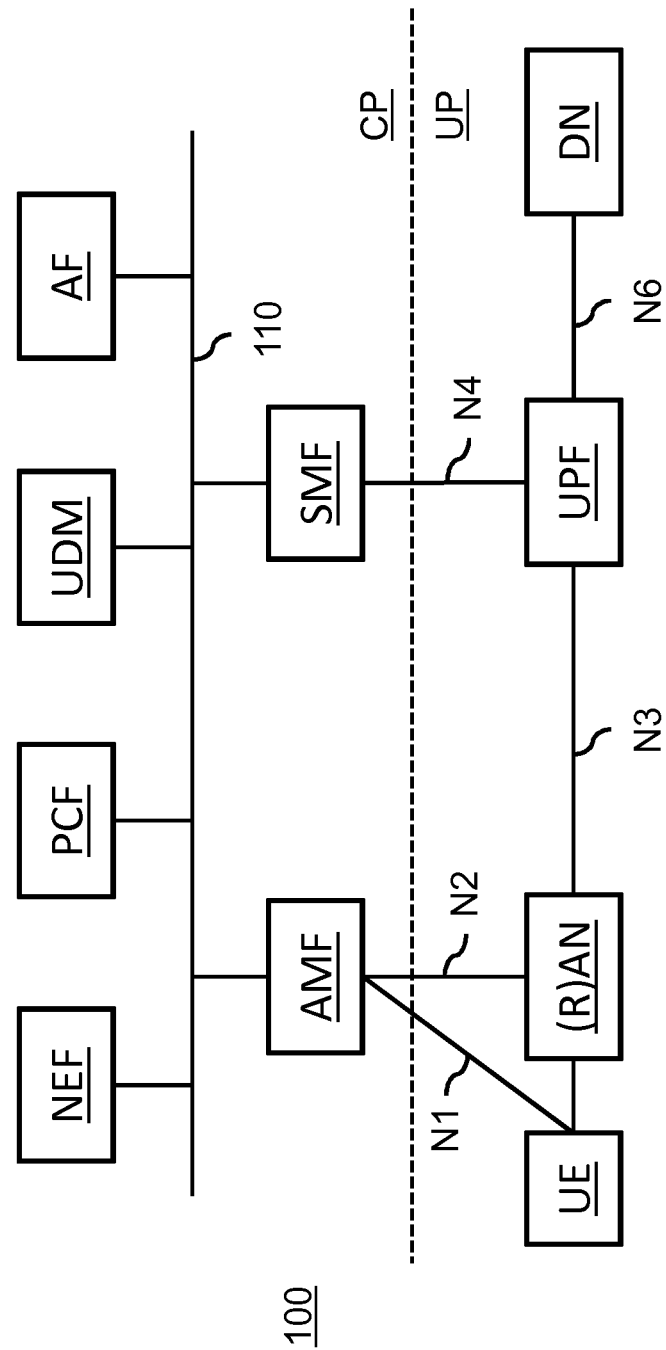
FIG. 1 shows a prior art 3GPP telecommunication network which comprises a control plane (CP) and a user plane (UP) and various 3GPP network functions.

It should be noted that items which have the same reference numbers in different figures, have the same structural features and the same functions, or are the same signals. Where the function and/or structure of such an item has been explained, there is no necessity for repeated explanation thereof in the detailed description.

LIST OF REFERENCE AND ABBREVIATIONS

The following list of references and abbreviations is provided for facilitating the interpretation of the drawings and shall not be construed as limiting the claims.

N1-N6 interfaces
AF application function
AMF access and mobility management function
CP control plane
DN data network
DNN data network name
DNAI data network access identifier
ICN information centric networking
ICN-AF ICN application function
NEF network exposure function
PCF policy control function
PDU protocol data unit
(R)AN (radio) access network
SMF session management function
UDM unified data management
UE user equipment
UP user plane
UPF user plane function
100 connectivity provider's network
110 service bus
120-124 ICN island
130 switching function
132 UPF as ICN router
200 system representing network node
210 network interface
220 processor
230 storage
300 computer readable medium
310 non-transitory data
1000 exemplary data processing system
1002 processor
1004 memory element
1006 system bus
1008 local memory
1010 bulk storage device
1012 input device
1014 output device
1016 network adapter
1018 application

DETAILED DESCRIPTION OF EMBODIMENTS

The following embodiments are described in the context of a telecommunication network adhering to one or more 5G 3GPP standards, such as [5] which is hereby incorporated by reference at least in as far as pertaining to its architecture and network functions. In these embodiments, network functions as claimed other than the ICN application function (ICN-AF) may be further explained in accordance with the following glossary. This glossary, however, is not meant to limit the interpretation of the claims. Namely, the concepts described in the following embodiments may equally apply, mutatis mutandis, to any other type of communication network having separate user and control planes and network functions capable of performing the functions as defined by the wording of the claims.

Glossary of Terms

AMF—Access and Mobility Management Function: may provide UE-based authentication, authorization, and mobility management. The AMF may be the first element that a UE connects to when it wishes to use a 5G network.

DN—Data Network: may represent a network outside of the 5G network. This may still be inside the operator's network, or may be outside, facing the Internet.

NEF—Network Exposure Function: may expose the network functions and capabilities of the 5G network to 3rd parties, e.g., not affiliated with the operator.

PCF—Policy Control Function: may be responsible for policy control in order to enable Quality of Service (QoS) management.

PDU—Protocol Data Unit: this term may refer to a packet or frame exchanged between a UE and an entity in the Data Network.

PDU Session: an association between the UE and a Data Network (DN) that provides a PDU connectivity service. The type of association may be IP, Ethernet or Unstructured. Via a PDU session the UE may exchange data with the particular DN.

(R)AN—(Radio) Access Network: part of the network that connects the UE with the core 5G network (e.g., AMF, PCF, NEF, SMF, UPF may be in the core).

SMF—Session Management Function: may be responsible for session management and may allocate addresses to UEs; may also select and control the UPFs for data transfer; the SMF may be seen as an SDN network controller.

UE—User Equipment: may represent an end-user device (e.g. mobile phone, tablet, smart watch, VR headset, TV, set-top box, laptop, etc.).

UPF—User Plane Function: may route the PDU sessions of UEs across the 5G network; it may be seen as a network router or switch or forwarder.

Prior Art Network

FIG. 1 shows the general architecture of a communication network 100 as described by [5] which may represent a connectivity provider's network, and in which an application function (AF) is provided as a control plane function operating in the control plane CP of the network. It can be seen that the AF is connected to a service bus 110 in the control plane CP. FIG. 1 further illustrates the user plane UP, and interfaces N1, N2 and N4 which may be used by the control plane to setup data-paths in the user plane. In addition, a N6 interface is shown to an (external) data network DN.

Schematic Overview

Figure 2:
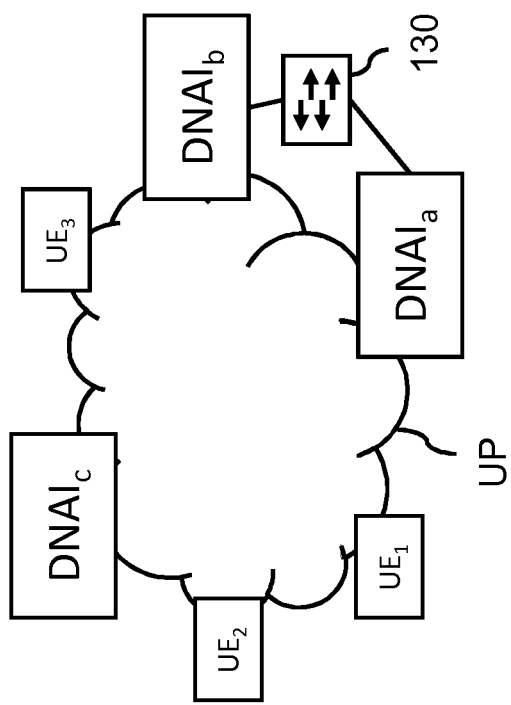
FIG. 2 shows a schematic and conceptual overview of a communication network having three ICN-UEs and three DNAIs from the perspective of the ICN-AF.

FIG. 2 provides a schematic and conceptual overview of the communication network from the perspective of an ICN application function (ICN-AF). This ICN-AF may be a newly provided network function which may control and influence ICN protocol-based traffic in the communication network. In this example, three UEs (UE1-UE3) are shown to be connected to the user plane (UP) of the network, while three data network access points (DNAIa-DNAIc) are provided. Here, the term 'DNAI' refers to Data Network Access Identifier, but with the term being used here and elsewhere as a representation of the data network access point which is identified by the respective DNAI. In general, a data network access point may represent an exit link to a specific Data Network Name (DNN), e.g., as defined in accordance with 3GPP TS 23.501.

The UEs may act as ICN nodes within an ICN network (not explicitly shown in FIG. 2) and may exchange content via ICN protocol-based traffic. Such UEs are also referred to as ICN-UE's or simply as ICN nodes. Generally, the ICN-UEs may use ICN protocols to exchange content over Ethernet, IP or Unstructured PDU sessions.

FIG. 2 shows an embodiment in which Ethernet PDU sessions are used and in which PDU sessions may be switched via internal switches of the network, e.g., via one or more User Plane Functions (UPF) hosting a DNAI. However, such switching may also involve external switches, e.g., the switch 130 between DNAIa and DNAIb.

The newly provided ICN-AF may control the ICN protocol-based traffic flow between the ICN-UE's. The ICN-AF itself is not shown in FIG. 2. However, briefly speaking, the ICN-AF may receive ICN layer information from an ICN router which is indicative of a congestion state of a current PDU session of user equipment. An example of such an ICN router may be the aforementioned UPF via which a current PDU session of user equipment (e.g, UE1) may be routed and which may be modified to report the ICN layer information to the ICN-AF. If the congestion state indicates a presence of congestion, a new PDU session for the user equipment (UE1) may be established, or a quality of service (QoS) characteristic of the current PDU session may be upgraded. This may involve the ICN-AF communicating with the session management function (SMF, not shown explicitly in FIG. 2) and effecting said upgrading/newly-establishing via the SMF's session management capability.

As will also be further explained with reference to FIGS. 4A-6B and others, the congestion handling may involve different entities, such as the ICN router, the ICN-AF and the SMF, and possibly other entities such as a policy control function (PCF). Effectively, the ICN router may obtain ICN layer information and the SMF may effect the upgrading/newly-establishing of the PDU session, while any one of the aforementioned ICN router, ICN-AF and the SMF may detect the congestion based on the ICN layer information and decide how to reduce the congestion, e.g., whether to upgrade the existing PDU session or to establish a new PDU session.

The ICN-AF itself may have standard 3GPP functionality of the AF network function as well as ICN specific functionality implementing the described functionality.

ICN-UE and ICN Islands

Figure 3:
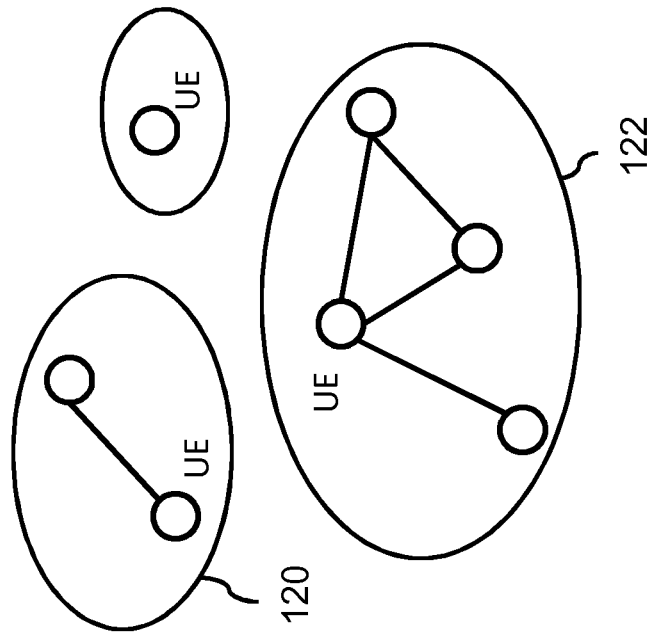
FIG. 3 illustrates two ICN-UEs which each connect an ICN network ('ICN island') to the communication network, as well as an individual ICN-UE.

FIG. 3 illustrates the following. An ICN-UE may take part in the exchange of content, e.g., by publishing or requesting content, solely by itself. However, an ICN-UE may also connect an 'island' 120, 122 of other ICN nodes to the communication network, in which case it may publish or request content on behalf of other ICN nodes in the island 120, 122 and it becomes an ICN Router. Moreover, an ICN-UE may represent both a publisher and a requester of content, both by its own or by way of the ICN-UE connecting an ICN island to the network. For example, in case of the ICN-UE connecting an ICN island to the communication network, a portion of the ICN nodes within the ICN island may be publishers and another portion of the ICN node may be requesters. A reference to an ICN-UE being a 'publisher' thus does not exclude the ICN-UE also being a 'requester'.

Congestion Handling

Figure 4A:
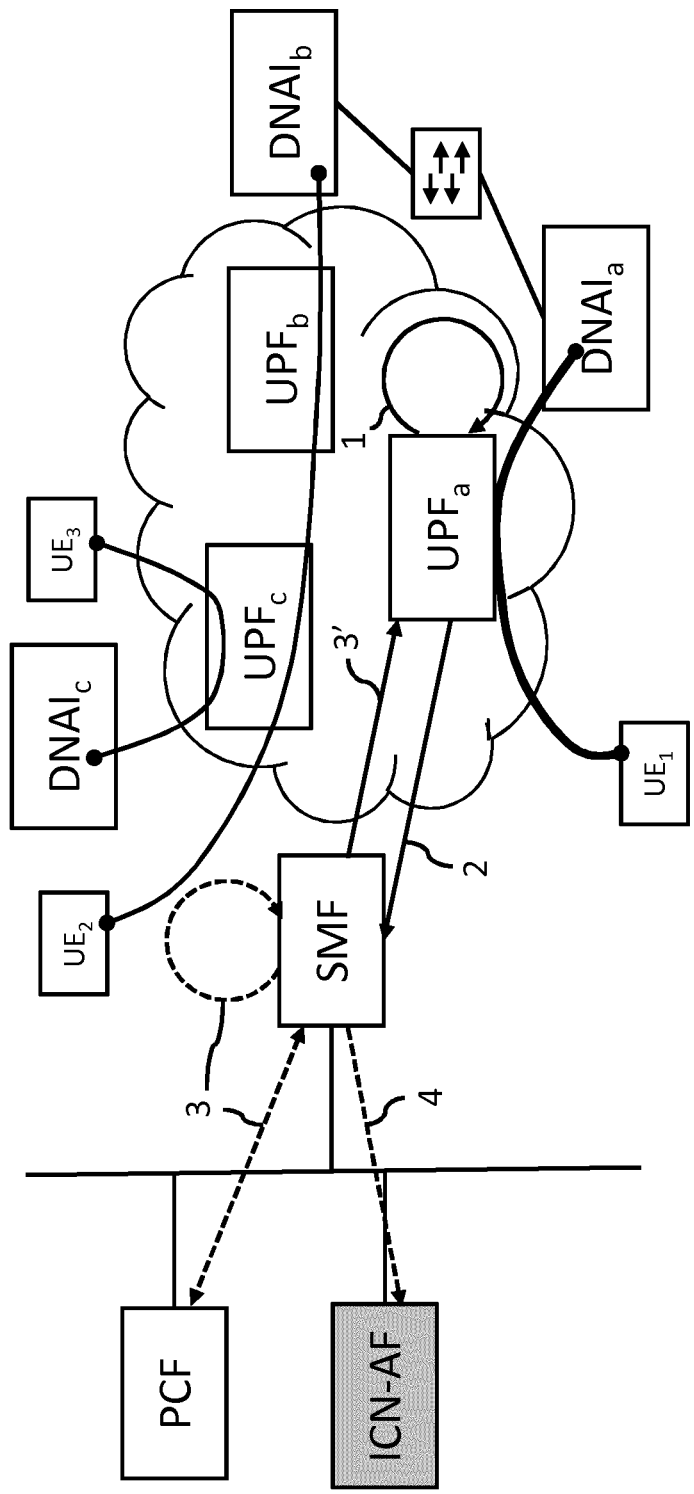
FIG. 4A illustrates congestion handling by the SMF based on PDU session information causing QoS characteristics of the PDU session of UE1 to be upgraded.
Figure 4B:
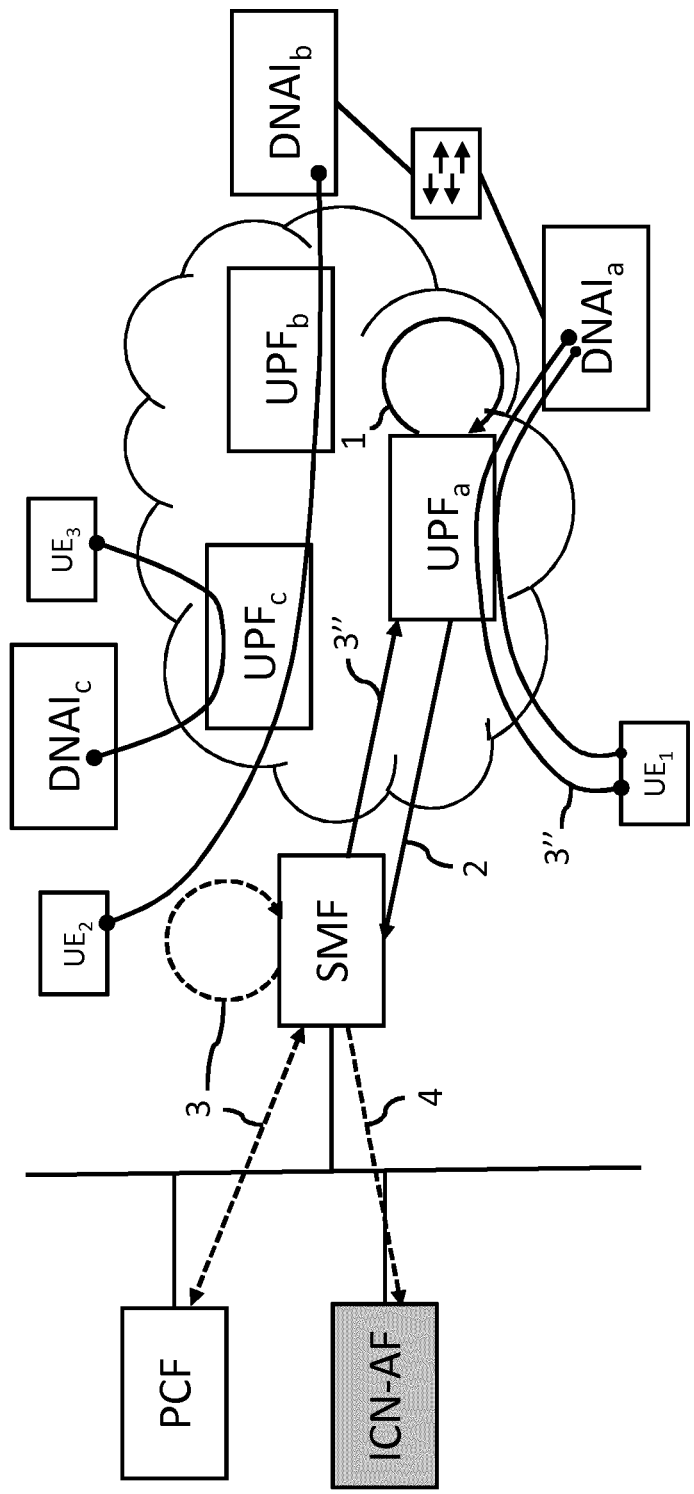
FIG. 4B illustrates a new PDU session established for UE1.

FIGS. 4A and 4B illustrates congestion handling by the SMF. In this example, the congestion handling is based on PDU session information and results in either QoS characteristics of the PDU session of UE1 being upgraded (FIG. 4A) or a new PDU session being established for UE1 (FIG. 4B). The congestion handling may involve the following message exchange (the numbering matching FIGS. 4A, 4B):

1. UPFa may determine that the PDU session of UE1 is approaching its QoS limits.

2. UPFa may notify the SMF of the PDU session of UE1 approaching its QoS limits.

3. If possible, the SMF may upgrade the QoS characteristics of the existing PDU session of UE1 (3' in FIG. 4A, also denoted by the line representing the existing PDU session from UE1 to DNAIa being shown in bold). Alternatively, the SMF may establish a new PDU session for UE1 (3" in FIG. 4B, also denoted by a further connection/line from UE1 to DNAIa). An example of a QoS characteristic may be the bandwidth. It is noted that the possibility of increasing the QoS characteristic may depend on the current resources in the communication network and/or on the policies set for the UE1. The latter may be obtained from the PCF (3-dashed in FIGS. 4A, 4B), e.g., as policy data, thereby enabling the SMF to decide between upgrading the QoS characteristic of the existing PDU session or establishing a new PDU session.

4. The SMF may inform the ICN-AF of the implemented change, or if the change could not be implemented, of the latter fact and possibly reasons for it.

Figure 5A:
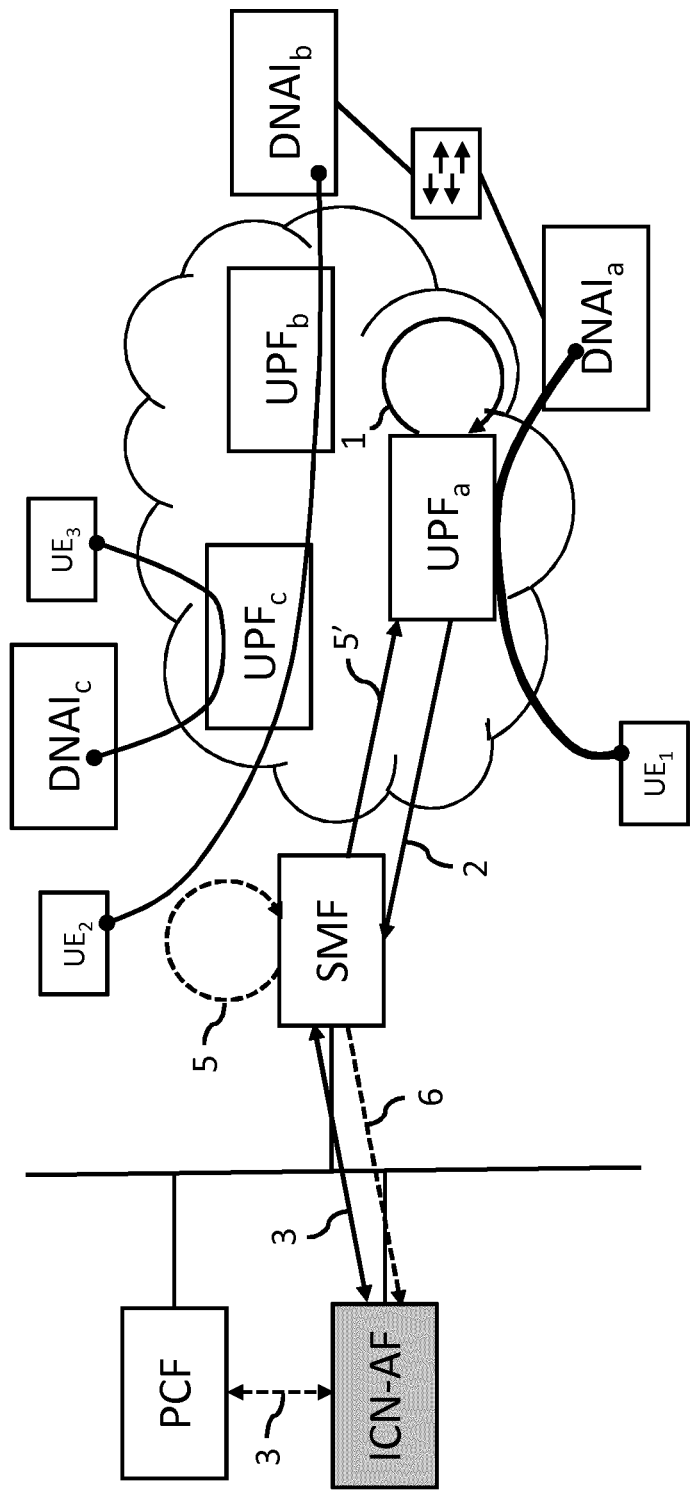
FIG. 5A illustrates congestion handling by the ICN-AF based on PDU session information causing QoS characteristics of the PDU session of UE1 to be upgraded.
Figure 5B:
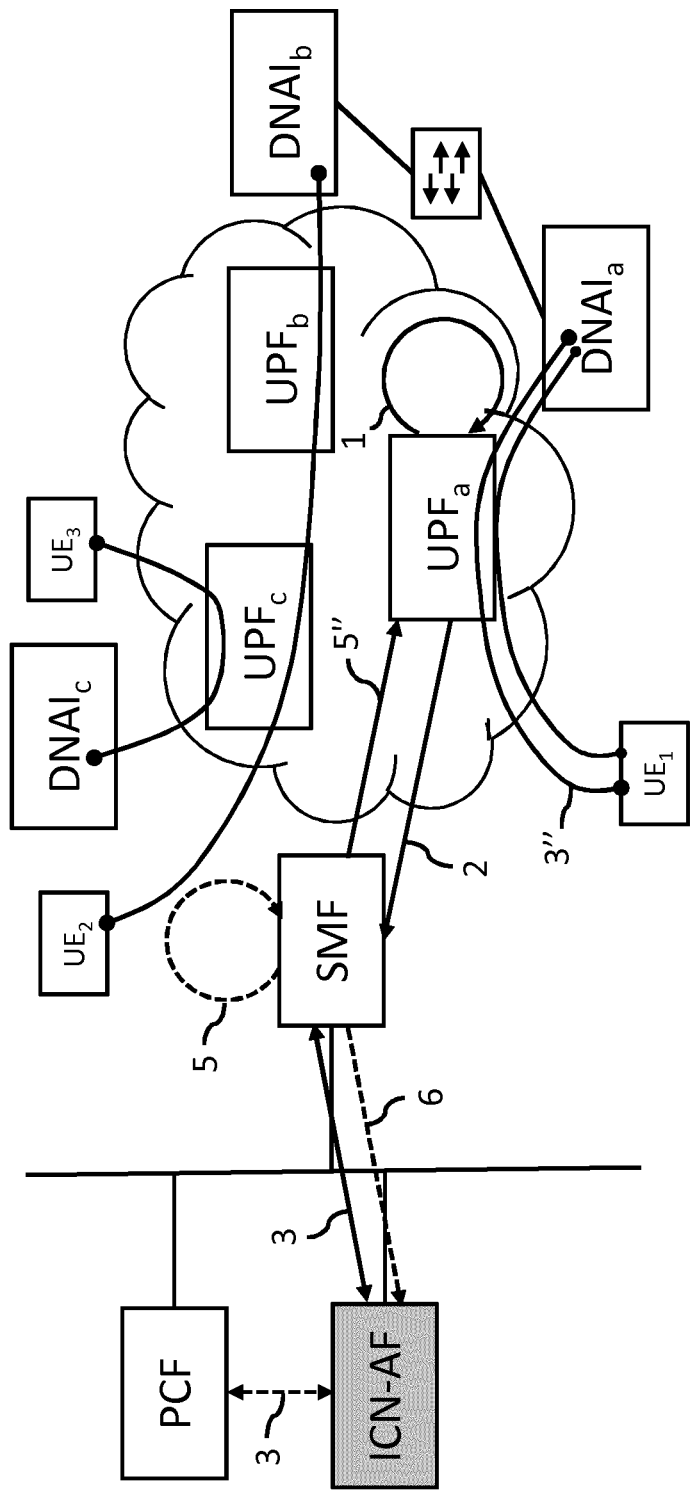
FIG. 5B illustrates a new PDU session established for UE1.

FIGS. 5A and 5B illustrate an alternative embodiment to the FIG. 4A, 4B embodiment, in which steps 1 and 2 may be as above, while at step 3, the SMF may inform the ICN-AF about the PDU session of UE1 approaching its limits. The message exchange may then continue as follows (the numbering matching FIGS. 5A, 5B):

4. The ICN-AF may decide whether the current QoS characteristics of the PDU session of UE1 should be upgraded, or whether a new PDU session for UE1 should be established. This decision may be based on policy data from the PCF, which may indicate a current QoS policy which is set for the PDU session of UE 1. The policy data may be obtained by the ICN-AF from the PCF. The ICN-AF may then request the SMF to effect either of the two options, depending on the ICN-AF's decision.

5. If possible, e.g., based on the current resources in the network, the SMF may upgrade the QoS characteristics of the existing PDU session of UE1 (5' in FIG. 5A, also denoted by the line representing the existing PDU session from UE1 to DNAIa being shown in bold). Alternatively, the SMF may establish a new PDU session for UE1 (5" in FIG. 5B, also denoted by a further connection/line from UE1 to DNAIa).

6. The SMF may inform the ICN-AF of the implemented change, or if the change could not be implemented, of the latter fact and possibly reasons for it.

Figure 6A:
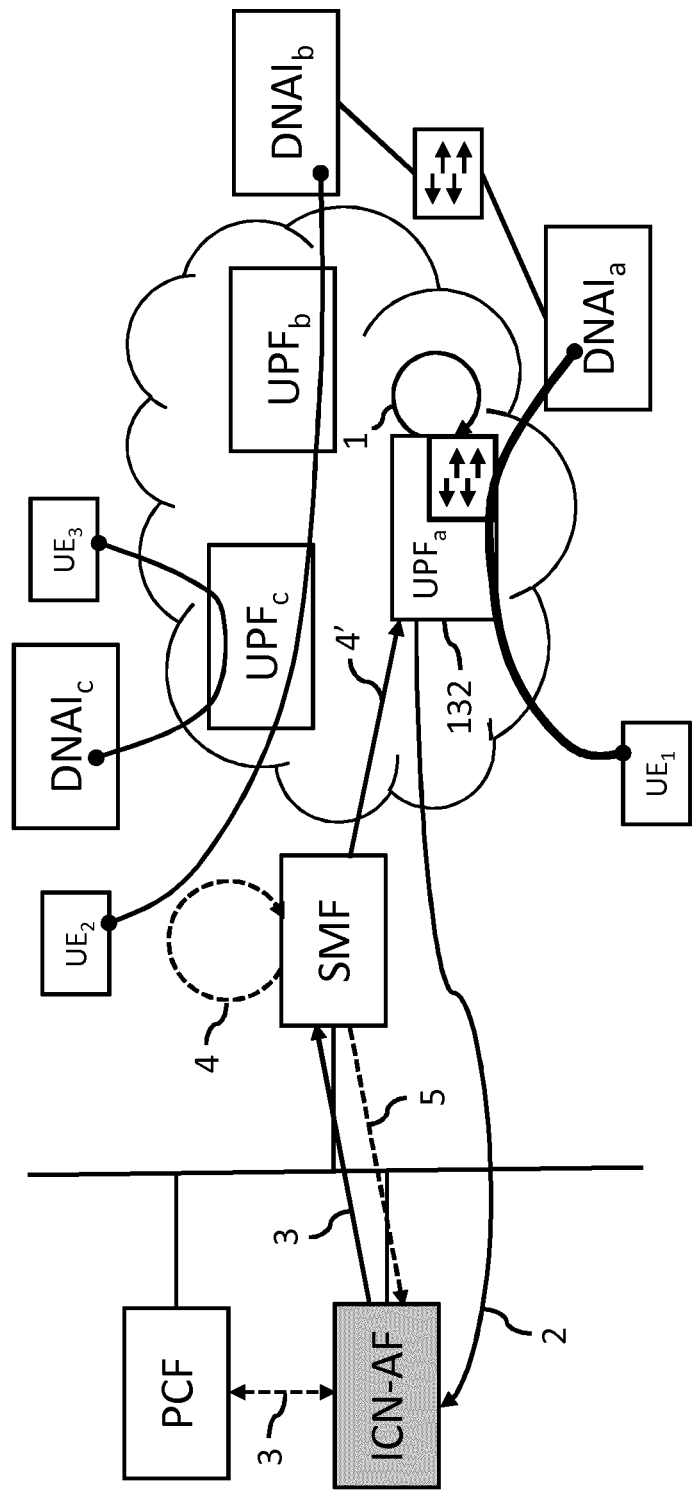
FIG. 6A illustrates congestion handling by the ICN-AF based on ICN level information causing QoS characteristics of the PDU session of UE1 to be upgraded.
Figure 6B:
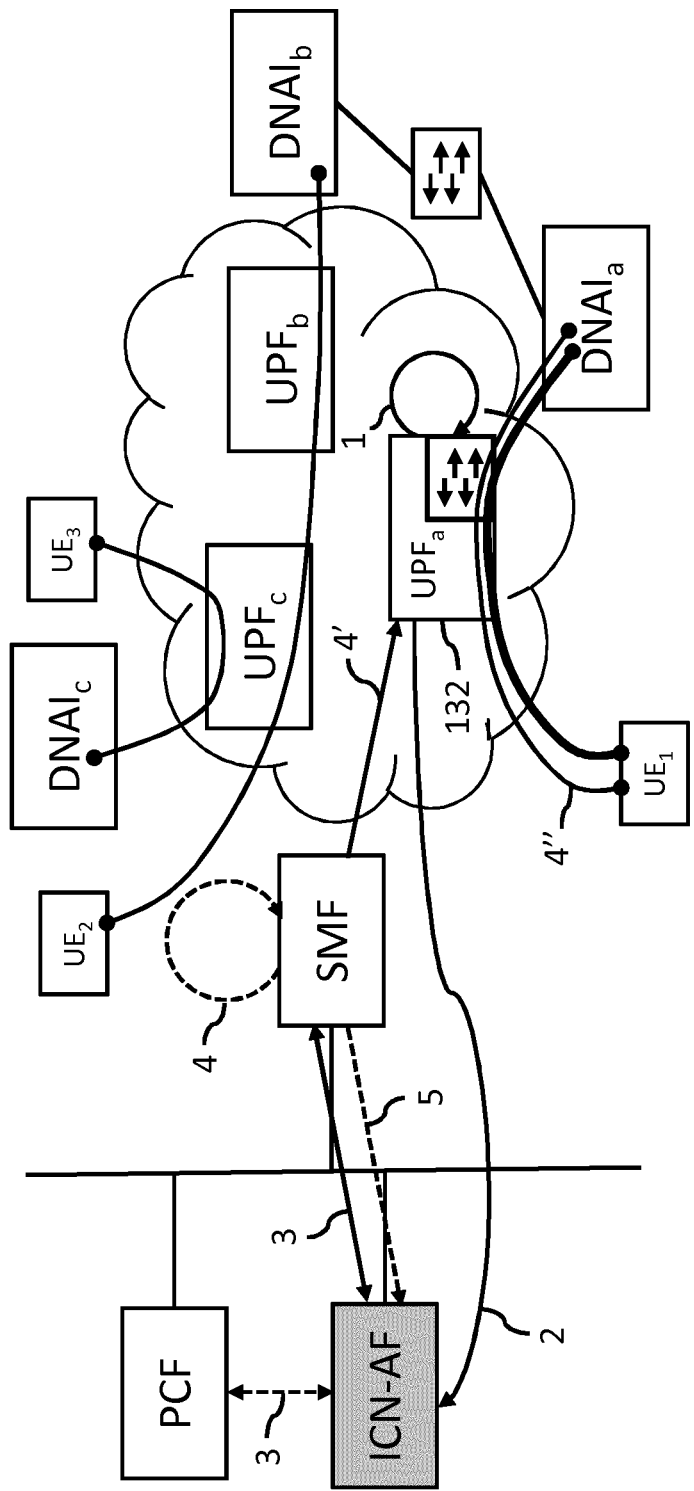
FIG. 6B illustrates a new PDU session established for UE1.

FIGS. 6A and 6B illustrate congestion handling by the ICN-AF. In these examples, the congestion handling may be based on ICN level information, and result in either a QoS characteristic of the PDU session of UE1 being upgraded (FIG. 6A) or a new PDU session being established for UE1 (FIG. 6B). In these examples, the UPFa 132 may also function as an ICN router, for example by having integrated ICN (application) logic, and may in the following also simply referred to as ICN router 132.

In this example, the ICN router 132 may be configured to monitor the pending interest table (PIT) and to set a timer for each new entry added to the PIT. The message exchange may be as follows (the numbering matching FIGS. 6A, 6B).

1. The ICN router 132 may determine there are one or more PIT entries for which it takes a long time before they are satisfied and may consider this to be a sign of congestion.

For example, the ICN router 132 may detect that the amount or percentage of PIT entries which are satisfied after a time greater or equal to a certain value ti, is above a threshold Pj, and consider this to be a sign of congestion.

2. The ICN router 132 may notify the ICN-AF about the congestion.

3. The ICN-AF may decide whether the current QoS characteristics of the PDU session of UE1 should be upgraded, or whether a new PDU session for UE1 should be established, and may communicate its decision to the SMF. This decision may be based on policy data from the PCF (3-dashed in FIG. 6A, 6B).

4. If possible, e.g., based on the current resources in the network, the SMF may upgrade the QoS characteristics of the existing PDU session of UE1 (4' in FIG. 6A, also denoted by the line representing the existing PDU session from UE1 to DNAIa being shown in bold). Alternatively, the SMF may establish a new PDU session for UE1 (5" in FIG. 6B, also denoted by a further connection/line from UE1 to DNAIa).

5. The SMF may inform the ICN-AF of the implemented change, or if the change could not be implemented, of the latter fact and possibly reasons for it.

UPF as ICN Router

In yet another example, where the UPFa is also an ICN router, congestion may be detected by comparing the throughput of ICN data packets with a QoS characteristics, such as the capacity, of the corresponding PDU session. If the throughput of ICN data packets is close to the QoS characteristics (capacity) of the PDU session, e.g. within a certain absolute or percental value ek, then congestion may be considered to be detected, which may then be followed by an QoS characteristics of the existing PDU session of UE1 being upgraded or a new PDU session being established for UE1, for example, as described with reference to FIGS. 4A-6B.

There may be various ways of comparing the throughput of ICN data packets with the QoS characteristics (capacity) of the PDU session:

a. The ICN router may obtain both types of information (throughput of ICN data packets, QoS characteristic) by communicating with the UPFa directly, which may be internal communication if the ICN router is implemented by the UPFa. The ICN router may them determine whether there is congestion and inform the ICN-AF thereof. In turn, the ICN-AF may decide how to reduce congestion, which may generally involve the aforementioned options of 1) an QoS characteristics of the existing PDU session of UE1 being upgraded or 2) a new PDU session being established for UE1.

b. The ICN router may obtain both types of information from communicating with the UPFa directly and send the information to the ICN-AF which may then determine whether there is congestion and how to reduce the congestion.

c. The ICN router may not communicate with the UPFa directly, but may send ICN layer information which is indicative of the ICN data packet throughput to the ICN-AF. The ICN-AF may request the QoS characteristics of the PDU session from the SMF, which in turns may request said characteristics from the UPFa. The ICN-AF may then receive the QoS characteristic via the SMF and use the received information to determine whether there is congestion and how to reduce the congestion.

d. Same as option c, except that the ICN-AF may send the ICN layer information which may be received from the ICN router to the SMF, with the SMF then determining whether there is congestion and how to reduce the congestion.

e. Same as option d, except that the SMF may ask the ICN-AF about the decision on how to reduce the congestion, e.g., whether to upgrade the QoS characteristics of the existing PDU session of UE1 or establish a new PDU session.

It is noted that in general, the quality of service (QoS) characteristic of the current PDU session which may be upgraded may include one or more of: the guaranteed capacity, the packet delay budget, resource type, maximum data burst, etc.

If policy data is obtained from the PCF which is indicative of a QoS policy associated with the existing PDU session and the ICN-AF is allowed to change the QoS of the PDU session, such policy data may be used to decide between whether to upgrade the QoS characteristics of the existing PDU session of UE1 or establish a new PDU session. For example, when the ICN-AF is provided with the policy data, the ICN-AF may determine whether an increase in the maximum throughput is required which will trigger the establishment of a new PDU Session, or whether there are QoS parameters which may be changed to reduce or eliminate the congestion. In the latter case, the ICN-AF may request the SMF to change these QoS parameter(s).

ICN Router

It is noted that, in general, Ethernet PDU sessions may be convenient because multiple QoS flows may be provided in the 5G network and because the UPFs have switching functionality. Namely, the UPFs may be considered regular ethernet switches (as indicated in FIG. 6A/6B by a switch being shown as an integral part of the UPFa), with each PDU session being a link. Since ICN protocol-based traffic may already be defined to flow over Ethernet, no special handling may be necessary.

This Ethernet-type of switching may also be performed outside of the 3GPP network, even between DNAIs, when using external switches. This may be especially useful in situations where the 3GPP network operator and the ICN network operator have or may have different levels of technical relations. If the switching is performed outside of the 3GPP network, the ICN-AF may be aware of such a switching function either by configuration or standard dynamic switch-controller association establishment, for example via an interface from the external switch to the ICN-AF. A switching function may also be aware of ICN layer traffic and have an interface to the ICN-AF over which ICN layer information, such as Interest and Data message statistics, topology messages, etc., may be exchanged. Such a switching function is elsewhere also referred to as ICN router. In this case, the switching function may act as a data collection point and provide information to the ICN-AF. The ICN-AF may obtain more information upon which to base its control of ICN protocol-based traffic flow.

Instead of Ethernet PDU sessions, Unstructured PDU sessions may also be used. To enable their use, a routing entity may need to be provided outside of the 3GPP network, as well as an ICN router behind the UPF. Furthermore, an adaptation of the ICN layer in the UE to the point-to-point PDU session may be needed, for example in the form of ICN over PPPoE or another point-to-point like tunnel.

In general, whenever a PDU session has a corresponding entity in the ICN Router, for example a Tunnel ID (in case the ICN router function is implemented by the UPF) or a Face ID (in case of Unstructured PDU session type), throughput statistics may be provided to the ICN-AF. Based on these throughput statistics, the ICN-AF may for example upgrade a QoS characteristic of an existing PDU session of a particular UE or request a new, e.g., second, PDU session to be established for the particular UE.

The ICN packets may also be carried in UDP or TCP/IP over the PDU session layer, at the expense of additional overhead. Using this encapsulation might be beneficial when directly connecting to an existing UDP or TCP/IP overlaid ICN network.

General

In some embodiments, the ICN-AF may partly reside in the control plane and partly in the user plane of the communication network. For that purpose, the ICN-AF may be partitioned in an application function control plane part operating in the control plane and an application function user plane part operating in the user plane. The latter may be embodied by a switching function or an ICN router.

In some embodiments, the communication network may be configured to enable instantiation of different network slices. In such embodiments, ICN traffic may flow via a dedicated network slice, isolating it from other traffic handled by the network.

Data Processing Entities

Figure 7:
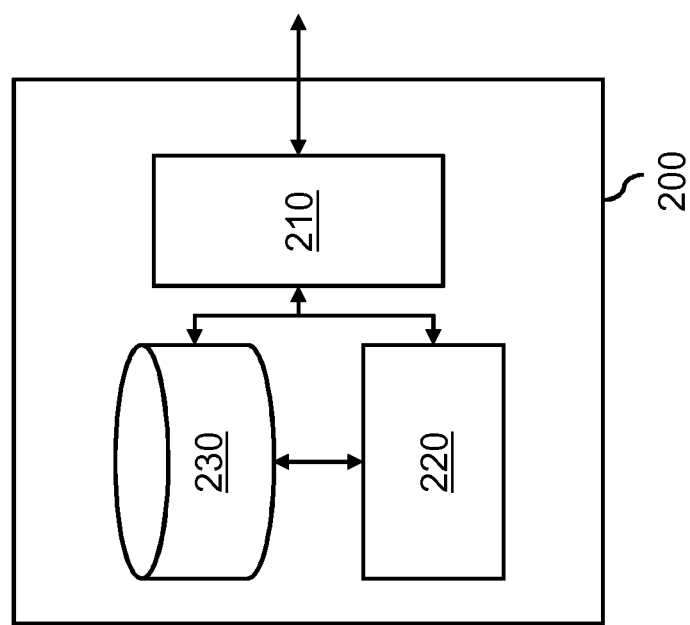
FIG. 7 shows a system which may represent a network node implementing the ICN-AF, or an ICN router, or an SMF.

FIG. 7 shows a system 200 which may represent a device or network node implementing an ICN-AF, an ICN router or an SMF. FIG. 7 shows the system 200 to comprise a network interface 210 for communicating with (other) network nodes in the network. The network interface 210 may take any suitable form, including but not limited to a wired network interface based on Ethernet or optical fiber or a wireless network interface. FIG. 7 further shows the system 200 comprising a storage 230, such as a hard disk, a solid-state drive, or an array thereof, which may be used by the system 200 for storing data. The system 200 may further comprise a processor 220 which may be configured, e.g., by hardware design or software, to perform the operations described with reference to FIG. 2-8 in as far as pertaining to an ICN-AF, an ICN router or an SMF. For example, the processor 220 may be embodied by a single Central Processing Unit (CPU), but also by a combination or system of such CPUs and/or other types of processing units. In general, the system 200 may be embodied by a device or apparatus but also by a distributed system of such devices or apparatuses.

The aforementioned device or apparatus may comprise one or more (micro)processors which execute appropriate software. Software implementing the functionality of the function(s) may have been downloaded and/or stored in a corresponding memory or memories, e.g., in volatile memory such as RAM or in non-volatile memory such as Flash. Alternatively, the function(s) may be implemented in the device or apparatus in the form of programmable logic, e.g., as a Field-Programmable Gate Array (FPGA). In general, each function may be implemented as a circuit.

Figure 8:
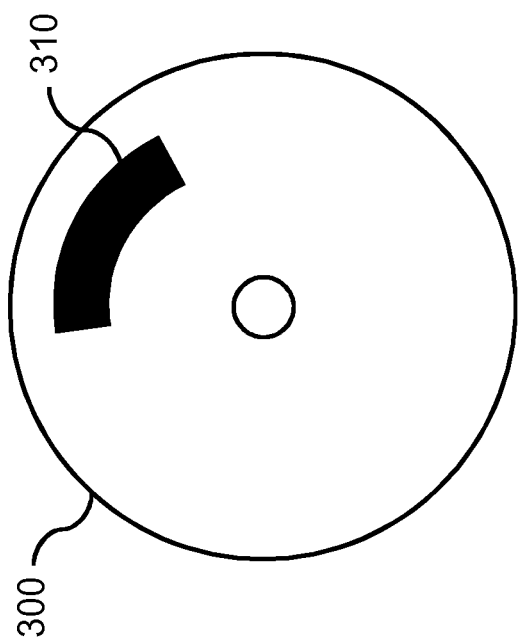
FIG. 8 shows a computer readable medium comprising non-transitory data comprising instructions for causing a processor system to perform the method.

It is noted that any of the methods described in this specification, for example in any of the claims, may be implemented on a computer as a computer implemented method, as dedicated hardware, or as a combination of both. Instructions for the computer, e.g., executable code, may be stored on a computer readable medium 300 as for example shown in FIG. 8, e.g., in the form of a series 310 of machine readable physical marks and/or as a series of elements having different electrical, e.g., magnetic, or optical properties or values. The executable code may be stored in a transitory or non-transitory manner. Examples of computer readable mediums include memory devices, optical storage devices, integrated circuits, servers, online software, etc. FIG. 8 shows by way of example an optical storage device 300.

Figure 9:
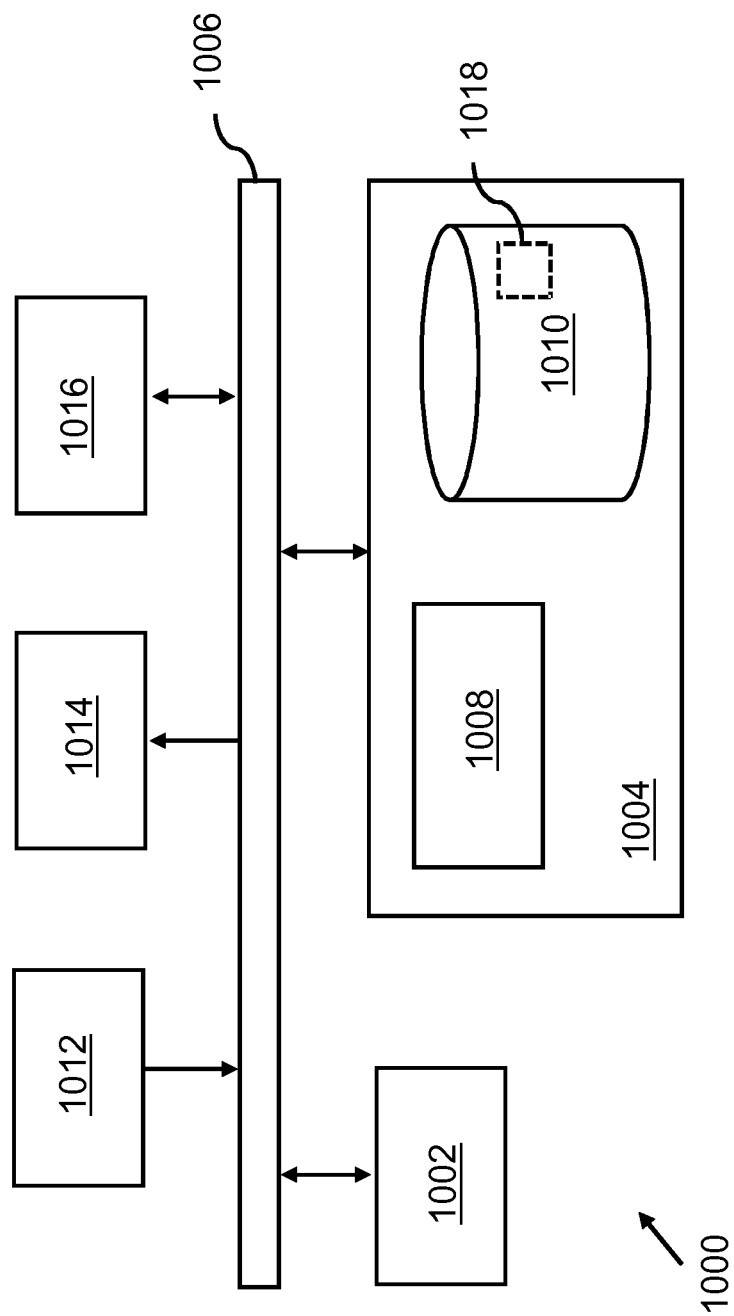
FIG. 9 shows an exemplary data processing system.

FIG. 9 is a block diagram illustrating an exemplary data processing system that may be used in the embodiments described in this specification. Such data processing systems include data processing entities described in this specification, including but not limited to data processing entities implementing functions such as but not limited to an ICN-AF, an ICN router, an SMF, etc.

The data processing system 1000 may include at least one processor 1002 coupled to memory elements 1004 through a system bus 1006. As such, the data processing system may store program code within memory elements 1004. Further, processor 1002 may execute the program code accessed from memory elements 1004 via system bus 1006. In one aspect, data processing system may be implemented as a computer that is suitable for storing and/or executing program code. It should be appreciated, however, that data processing system 1000 may be implemented in the form of any system including a processor and memory that is capable of performing the functions described within this specification.

Memory elements 1004 may include one or more physical memory devices such as, for example, local memory 1008 and one or more bulk storage devices 1010. Local memory may refer to random access memory or other non-persistent memory device(s) generally used during actual execution of the program code. A bulk storage device may be implemented as a hard drive, solid state disk or other persistent data storage device. The processing system 1000 may also include one or more cache memories (not shown) that provide temporary storage of at least some program code in order to reduce the number of times program code must be retrieved from bulk storage device 1010 during execution.

Input/output (I/O) devices depicted as input device 1012 and output device 1014 optionally can be coupled to the data processing system. Examples of input devices may include, but are not limited to, for example, a microphone, a keyboard, a pointing device such as a mouse, or the like. Examples of output devices may include, but are not limited to, for example, a monitor or display, speakers, or the like. Input device and/or output device may be coupled to data processing system either directly or through intervening I/O controllers. A network adapter 1016 may also be coupled to data processing system to enable it to become coupled to other systems, computer systems, remote network devices, and/or remote storage devices through intervening private or public networks. The network adapter may comprise a data receiver for receiving data that is transmitted by said systems, devices and/or networks to said data and a data transmitter for transmitting data to said systems, devices and/or networks. Modems, cable modems, and Ethernet cards are examples of different types of network adapter that may be used with data processing system 1000.

As shown in FIG. 9, memory elements 1004 may store an application 1018. It should be appreciated that data processing system 1000 may further execute an operating system (not shown) that can facilitate execution of the application. The application, being implemented in the form of executable program code, can be executed by data processing system 1000, e.g., by processor 1002. Responsive to executing the application, the data processing system may be configured to perform one or more operations to be described herein in further detail.

In one aspect, for example, data processing system 1000 may implement an ICN-AF. In that case, application 1018 may represent an application that, when executed, configures data processing system 1000 to perform the functions described herein with reference to an ICN-AF. In another aspect, data processing system 1000 may implement an ICN router. In that case, application 1018 may represent an application that, when executed, configures data processing system 1000 to perform the functions described herein with reference to an ICN router. In another aspect, data processing system 1000 may implement an SMF. In that case, application 1018 may represent an application that, when executed, configures data processing system 1000 to perform the functions described herein with reference to an SMF.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. An information-centric networking application function (ICN-AF) for use with a communication network, wherein the communication network comprises a plurality of network nodes and is configured to provide:
    a control plane to enable transmission of control data in the communication network;
    a user plane to enable transmission of data to or from user equipment which is connected to the communication network; and
    a set of network functions which comprise control plane functions operating in the control plane, wherein the control plane functions include
        the information-centric networking application function (ICN-AF) for controlling a flow of ICN protocol-based traffic between a set of user equipment (UE), wherein the ICN protocol-based traffic is at least in part transported via protocol data unit (PDU) sessions in the communication network;
    wherein the communication network further comprises an ICN router for obtaining ICN layer information which at least in part characterizes the flow of the ICN protocol-based traffic which is transported via one or more PDU sessions;
    wherein the ICN application function (ICN-AF) is configured to:
        receive ICN layer information from the ICN router which is indicative of a congestion state of a current PDU session of user equipment (UE1); and
        based on the ICN layer information indicating congestion, initiate establishment of a new PDU session for the user equipment (UE1) or initiate upgrade of a quality of service (QoS) characteristic of the current PDU session;
    wherein the control plane functions further comprise a session management function (SMF) for session management of PDU sessions involving the user equipment, and wherein the ICN application function (ICN-AF) is configured to initiate the establishment of the new PDU session for the user equipment (UE1) or initiate the upgrade of the quality of service (QoS) characteristic of the current PDU session via the session management function (SMF);
    wherein the ICN layer information is indicative of a throughput of ICN packets of the ICN protocol-based traffic in the current PDU session, and wherein the ICN application function (ICN-AF) is further configured to:
        obtain capacity information from the session management function (SMF) which is indicative of a capacity of the current PDU session; and
        determine the congestion state of the current PDU session by comparing the capacity of the current PDU session to the throughput of ICN packets.

2. The information-centric networking application function (ICN-AF) according to claim 1, further configured to:
    based on the ICN layer information indicating congestion,
        request the session management function (SMF) to establish the new PDU session or to upgrade the quality of service (QoS) characteristic of the current PDU session; or
        trigger the user equipment (UE1) to establish the new PDU session.

3. The information-centric networking application function (ICN-AF) according to claim 1, wherein the control plane functions further comprise a policy control function (PCF) for policy control of quality of service in the communication network, and wherein the ICN application function (ICN-AF) is further configured to:
    obtain policy data indicative of a quality of service (QoS) policy for the current PDU session from the policy control function (PCF); and
    decide between establishing the new PDU session or upgrading the quality of service (QoS) characteristic of the current PDU session based on the quality of service (QoS) policy.

4. The information-centric networking application function (ICN-AF) according to claim 1, further configured to:
    forward the ICN layer information which is received from the ICN router and which is indicative of the congestion state of the current PDU session to the session management function (SMF) to enable the session management function (SMF) to establish the new PDU session for the user equipment (UE1) or to upgrade the quality of service (QoS) characteristic of the current PDU session.

5. A network node or a distributed system of network nodes configured as an information-centric networking application function (ICN-AF) for use with a communication network, wherein the communication network comprises a plurality of network nodes and is configured to provide:
    a control plane to enable transmission of control data in the communication network;
    a user plane to enable transmission of data to or from user equipment which is connected to the communication network; and
    a set of network functions which comprise control plane functions operating in the control plane, wherein the control plane functions include the information-centric networking application function (ICN-AF) for controlling a flow of ICN protocol-based traffic between a set of user equipment (UE), wherein the ICN protocol-based traffic is at least in part transported via protocol data unit (PDU) sessions in the communication network;
    wherein the communication network further comprises an ICN router for obtaining ICN layer information which at least in part characterizes the flow of the ICN protocol-based traffic which is transported via one or more PDU sessions;

wherein the network node or the distributed system of network nodes comprises:
  a network interface to the communication network for receiving ICN layer information from the ICN router which is indicative of a congestion state of a current PDU session of user equipment (UE1);
  a processor system configured to, based on the ICN layer information indicating congestion, initiate establishment of a new PDU session for the user equipment (UE1) or initiate upgrade of a quality of service (QoS) characteristic of the current PDU session;
  wherein the control plane functions further comprise a session management function (SMF) for session management of PDU sessions involving the user equipment, and wherein the processor system is further configured to initiate the establishment of the new PDU session for the user equipment (UE1) or initiate the upgrade of the quality of service (QoS) characteristic of the current PDU session via the session management function (SMF);
  wherein the ICN layer information is indicative of a throughput of ICN packets of the ICN protocol-based traffic in the current PDU session, and wherein the processor system is further configured to:
    obtain capacity information from the session management function (SMF) which is indicative of a capacity of the current PDU session; and
    determine the congestion state of the current PDU session by comparing the capacity of the current PDU session to the throughput of ICN packets.

6. An information-centric networking (ICN) router for use with a communication network, wherein the communication network comprises a plurality of network nodes and is configured to provide:
  a control plane to enable transmission of control data in the communication network;
  a user plane to enable transmission of data to or from user equipment which is connected to the communication network; and
  a set of network functions which comprise control plane functions operating in the control plane, wherein the control plane functions include an ICN application function (ICN-AF) for controlling a flow of ICN protocol-based traffic between a set of user equipment (UE), wherein the ICN protocol-based traffic is at least in part transported via protocol data unit (PDU) sessions in the communication network;
  wherein the ICN router is configured to:
    provide ICN layer information to the ICN application function (ICN-AF) which at least in part characterizes the flow of the ICN protocol-based traffic via one or more PDU sessions, wherein the ICN layer information is indicative of a congestion state of a current PDU session of user equipment (UE1);
    obtain information which is indicative of a throughput of ICN packets of the ICN protocol-based traffic in the current PDU session, the ICN router further configured to:
      provide said throughput information as or as part of the ICN layer information to the ICN application function (ICN-AF); or
      determine the congestion state of the current PDU session by comparing a capacity of the current PDU session to the throughput of ICN packets, and to generate the ICN layer information to represent the congestion state.

7. The information-centric networking (ICN) router according to claim 6, wherein the ICN router is implemented as part of a user plane function (UPF) via which the current PDU session of the user equipment (UE1) is routed, and wherein the ICN layer information is obtained from and/or by the user plane function (UPF).

8. The information-centric networking (ICN) router according to claim 7, further configured to:
  monitor a pending interest table (PIT) of the user plane function (UPF);
  determine the congestion state of the current PDU session of the user equipment (UE1) based on a characterization of when one or more entries in the pending interest table (PIT) are satisfied.

9. The information-centric networking (ICN) router according to claim 6, wherein the ICN router is implemented by a user equipment representing an ICN node connecting a plurality of ICN nodes to the communication network.

10. A network node or a distributed system of network nodes configured as information-centric networking (ICN) router for use with a communication network, wherein the communication network comprises a plurality of network nodes and is configured to provide:
  a control plane to enable transmission of control data in the communication network;
  a user plane to enable transmission of data to or from user equipment which is connected to the communication network; and
  a set of network functions which comprise control plane functions operating in the control plane, wherein the control plane functions include an ICN application function (ICN-AF) for controlling a flow of ICN protocol-based traffic between a set of user equipment (UE), wherein the ICN protocol-based traffic is at least in part transported via protocol data unit (PDU) sessions in the communication network;
  wherein the network node or the distributed system of network nodes comprises:
    a network interface to the communication network;
    a processor system configured to, via the network interface, provide ICN layer information to the ICN application function (ICN-AF) which at least in part characterizes the flow of the ICN protocol-based traffic via one or more PDU sessions, wherein the ICN layer information is indicative of a congestion state of a current PDU session of user equipment (UE1); obtain information which is indicative of a throughput of ICN packets of the ICN protocol-based traffic in the current PDU session, and to: 1) provide said throughput information as or as part of the ICN layer information to the ICN application function (ICN-AF); or 2) determine the congestion state of the current PDU session by comparing a capacity of the current PDU session to the throughput of ICN packets, and to generate the ICN layer information to represent the congestion state.

11. A communication network comprising a plurality of network nodes, wherein the communication network is configured to provide:
  a control plane to enable transmission of control data in the communication network;
  a user plane to enable transmission of data to or from user equipment which is connected to the communication network; and
  a set of network functions which comprise control plane functions operating in the control plane, wherein the control plane functions include an information-centric networking application function (ICN-AF) for controlling a flow of ICN protocol-based traffic between a set of user equipment (UE), wherein the ICN protocol-based traffic is at least in part transported via protocol data unit (PDU) sessions in the communication network;

wherein the communication network further comprises:

an ICN router configured to obtain ICN layer information which at least in part characterizes the flow of the ICN protocol-based traffic which is transported via one or more PDU sessions; and the ICN application function (ICN-AF), configured to:
 receive ICN layer information from the ICN router which is indicative of a congestion state of a current PDU session of user equipment (UE1); and
 based on the ICN layer information indicating congestion, initiate establishment of a new PDU session for the user equipment (UE1) or initiate upgrade a quality of service (QoS) characteristic of the current PDU session;

wherein the control plane functions further comprise a session management function (SMF) for session management of PDU sessions involving the user equipment, and wherein the ICN application function (ICN-AF) is configured to initiate the establishment of the new PDU session for the user equipment (UE1) or initiate the upgrade of the quality of service (QoS) characteristic of the current PDU session via the session management function (SMF);

wherein the ICN layer information is indicative of a throughput of ICN packets of the ICN protocol-based traffic in the current PDU session, and wherein the ICN application function (ICN-AF) is further configured to:
 obtain capacity information from the session management function (SMF) which is indicative of a capacity of the current PDU session; and
 determine the congestion state of the current PDU session by comparing the capacity of the current PDU session to the throughput of ICN packets.

12. A method for use with a communication network which comprises a plurality of network nodes and is configured to provide:

a control plane to enable transmission of control data in the communication network;

a user plane to enable transmission of data to or from user equipment which is connected to the communication network; and a set of network functions which comprise control plane functions operating in the control plane;

wherein the communication network further comprises an ICN router configured to obtain ICN layer information which at least in part characterizes a flow of ICN protocol-based traffic which is transported via one or more PDU sessions;

wherein the control plane functions comprise a session management function (SMF) for session management of PDU sessions involving the user equipment;

the method comprising:
 receiving ICN layer information from the ICN router which is indicative of a congestion state of a current PDU session of user equipment (UE1), wherein the ICN layer information is indicative of a throughput of ICN packets of the ICN protocol-based traffic in the current PDU session;
 obtaining capacity information from the session management function (SMF) which is indicative of a capacity of the current PDU session; and
 determining the congestion state of the current PDU session by comparing the capacity of the current PDU session to the throughput of ICN packets; and
 based on the ICN layer information indicating congestion, initiating establishment of a new PDU session for the user equipment (UE1) or initiating upgrade of a quality of service (QoS) characteristic of the current PDU session via the session management function (SMF).

13. A method for use with a communication network which comprises a plurality of network nodes and is configured to provide:

a control plane to enable transmission of control data in the communication network;

a user plane to enable transmission of data to or from user equipment which is connected to the communication network; and a set of network functions which comprise control plane functions operating in the control plane, wherein the control plane functions include an information-centric networking application function (ICN-AF) for controlling a flow of ICN protocol-based traffic between a set of user equipment (UE);

the method comprising:
 providing ICN layer information to the ICN application function (ICN-AF) which at least in part characterizes the flow of the ICN protocol-based traffic which is transported via one or more PDU sessions, wherein the ICN layer information is indicative of a congestion state of a current PDU session of user equipment (UE1);
 obtaining information which is indicative of a throughput of ICN packets of the ICN protocol-based traffic in the current PDU session, and:
 provide said throughput information as or as part of the ICN layer information to the ICN application function (ICN-AF); or
 determine the congestion state of the current PDU session by comparing a capacity of the current PDU session to the throughput of ICN packets, and to generate the ICN layer information to represent the congestion state.

14. A non-transitory computer-readable medium comprising a computer program, the computer program comprising instructions for causing a processor system to perform the method according to claim 12.

15. A non-transitory computer-readable medium comprising a computer program, the computer program comprising instructions for causing a processor system to perform the method according to claim 13.

* * * * *

UNITED STATES PATENT AND TRADEMARK OFFICE
CERTIFICATE OF CORRECTION

| | |
|---|---|
| PATENT NO. | : 11,503,498 B2 |
| APPLICATION NO. | : 17/268438 |
| DATED | : November 15, 2022 |
| INVENTOR(S) | : Toni Dimitrovski et al. |

It is certified that error appears in the above-identified patent and that said Letters Patent is hereby corrected as shown below:

On the Title Page

Item (73) Assignees:
Delete "KONINKLUKE KPN N.V., Rotterdam (NL); NEDERLANDSE ORGANISATIE VOOR TOEGEPAST-NATUURWETEN SCHAPPELIJK ONDERZOEK TNO, 'S-Gravenhage (NL)"

And insert:
-- KONINKLIJKE KPN N.V., Rotterdam (NL); NEDERLANDSE ORGANISATIE VOOR TOEGEPAST-NATUURWETENSCHAPPELIJK ONDERZOEK TNO, 'S-Gravenhage (NL) --.

Signed and Sealed this
Fourteenth Day of February, 2023

*Katherine Kelly Vidal*
Katherine Kelly Vidal
*Director of the United States Patent and Trademark Office*